United States Patent [19]

Clark et al.

[11] Patent Number: 4,641,338
[45] Date of Patent: Feb. 3, 1987

[54] UNITARY TELEPHONY FRAME ARM EXTENDER

[75] Inventors: Roger L. Clark, Grabill; Dennis D. Ray, Fort Wayne; James L. Martin, Avilla, all of Ind.

[73] Assignee: General Telephone Company of Indiana, Westfield, Ind.

[21] Appl. No.: 752,866

[22] Filed: Jul. 8, 1985

[51] Int. Cl.[4] .............................................. H04M 3/00
[52] U.S. Cl. ..................................................... 379/328
[58] Field of Search ................... 179/98; 361/425, 426

[56] References Cited

U.S. PATENT DOCUMENTS

| 3,955,868 | 5/1976 | Kindermann et al. | 179/98 |
| 4,017,768 | 4/1977 | Valfre | 179/98 |
| 4,176,257 | 11/1979 | De Luca | 179/98 |

OTHER PUBLICATIONS

"CMC 2730 Double Block Mounting Kit", pp. 45, 46, Communication Mfg. Co., Long Beach, Calif.

Primary Examiner—James L. Dwyer
Attorney, Agent, or Firm—J. Stephen Yeo

[57] ABSTRACT

A one-piece frame arm extender allows telephony terminal blocks to be mounted concurrently on a main distribution frame. The extender does not require any full assembly prior to being able to support itself.

1 Claim, 2 Drawing Figures

UNITARY TELEPHONY FRAME ARM EXTENDER

This invention pertains to components for telephone equipment frames, and more particularly is concerned with devices for extending elements of said frames.

BACKGROUND OF THE INVENTION

Large telephone switches found in central offices are connected to trunk and distribution wires through terminal blocks. The terminal blocks are supported on a main distribution frame located adjacent to the switch. The frame includes a number of metal traverse arms. Flanges are welded to the ends of some of the arms, and the terminal blocks are bolted to the flanges.

Newer switches are not necessarily compatible with terminal blocks used with older switches. When a central office is converted to a new switch, new terminal blocks must be wired in to replace the old.

Such conversions can take several weeks. During the conversion period, both old and new terminal blocks must be concurrently wired.

Kits are commercially available which extend the frame arms, so that both new and old blocks can be simultaneously accommodated on the frame during the conversion period. These kits include a bar which is clamped to the bottom of a frame by U bolts. The bars are drilled to accept a separate flange for bolting the new terminal block. During installation, the assembly of a number of small parts is required. This is difficult, at best, in an already cramped environment.

It would therefore be desirable to provide a unitary telephone main distribution frame arm extender for mounting terminal blocks.

DESCRIPTION OF THE INVENTION

Figure 1:
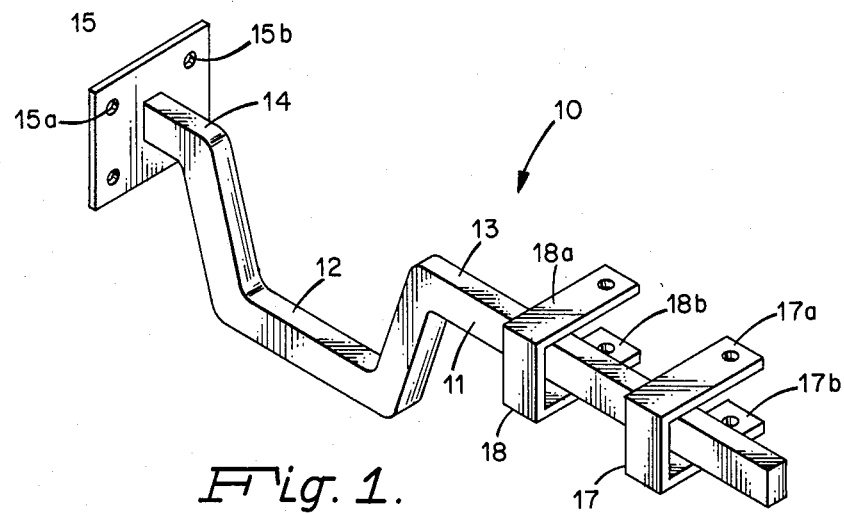
FIG. 1 is a view of an unitary telephony main distribution frame arm extender embodying the invention.

Referring first to FIG. 1, there is seen a unitary telephony main distribution frame arm extender 10 embodying the invention. The extender 10 has a bar 11 bent so as to have a U-shaped segment 12 separating two straight aligned segments 13, 14, one of which 13 is substantially longer than the other 14.

A flange 15 is welded to the end of the short segment. Holes 15a, b are drilled in the flange, so that a terminal block may be bolted to it.

At least two C-members 17, 18 are welded to the longer segment, so that the two parallel legs of each C-member 17, 18 extends orthogonally beyond the side of the bar 11.

Figure 2:
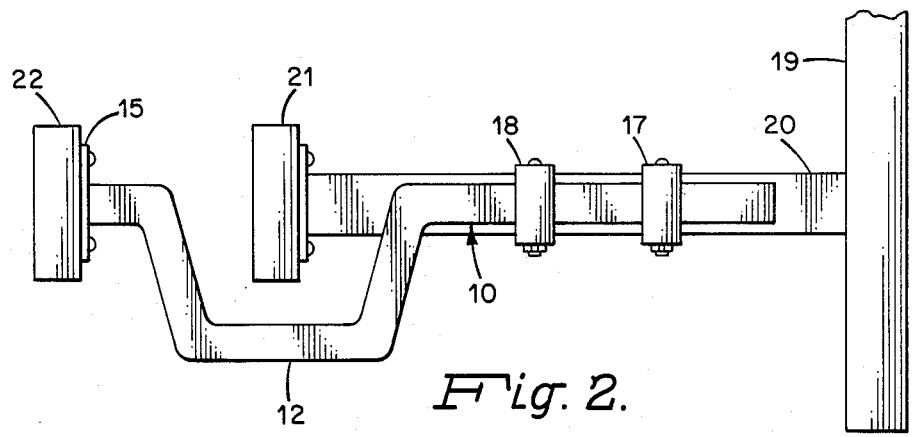
FIG. 2 is a side view of the extender installed on an arm of a main distribution frame.

Now referring to FIG. 2, the extender 10 is seen installed in a main distribution frame 19 such as found in a telephone company's central office.

The main distribution frame 19 includes a traverse arm 20 upon which a terminal block 21 is bolted. The main distribution frame arm extender 10 is one-piece (unitary) and slips on the arm 20 without assembly. The legs of C-shaped members are drilled, so that a nut and bolt can tighten the legs and securely clamp the extender to the arm. The U-shaped segment curves around the preexisting terminal block 21. A new terminal block 20 may be bolted to flange.

In the claims:

1. A unitary telephony main distribution frame arm extender comprised of:
   (a) a unitary bar having two aligned segments one of which is substantially longer than the other; and
   a generally U-shaped segment joining said aligned segments;
   (b) a flange permanently attached to the shorter of said aligned segments, and adapted for mounting a terminal block;
   (c) at least two unitary C-shaped members permanently attached to the larger of said aligned segments, each of said C-shaped members (C-members) including two parallel legs extending orthogonally from said bar and adapted to engage an arm of a telephony main distribution frame.

* * * * *